US006961073B2

(12) United States Patent
Kamir et al.

(10) Patent No.: US 6,961,073 B2
(45) **Date of Patent: *Nov. 1, 2005**

(54) METHOD AND SYSTEM FOR DISPLAYING AN IMAGE ON A SCREEN

(75) Inventors: Yosef Kamir, Mathanya (IL); Alex Weiss, Kadima (IL); Serge Steinblatt, Raanana (IL)

(73) Assignee: Varyframe Technologies Ltd., Netanya (IL)

( * ) Notice: Subject to any disclaimer, the term of this patent is extended or adjusted under 35 U.S.C. 154(b) by 0 days.

This patent is subject to a terminal disclaimer.

(21) Appl. No.: 10/750,761

(22) Filed: Jan. 5, 2004

(65) Prior Publication Data

US 2004/0135868 A1 Jul. 15, 2004

Related U.S. Application Data

(63) Continuation of application No. 09/781,900, filed on Feb. 13, 2001, now Pat. No. 6,686,941.

(51) Int. Cl.[7] ......................... B41J 2/385; G01D 15/06; G03G 15/01

(52) U.S. Cl. ....................................... 347/115; 347/139

(58) Field of Search ................................ 347/115, 139, 347/120; 399/159, 359; 40/524, 561, 564, 575, 577

(56) References Cited

U.S. PATENT DOCUMENTS

| | | | | | |
|---|---|---|---|---|---|
| 4,588,990 | A | * | 5/1986 | Tamura | 345/57 |
| 4,720,707 | A | * | 1/1988 | Konishi et al. | 345/57 |
| 4,723,138 | A | * | 2/1988 | Hashimoto et al. | 347/140 |
| 5,231,505 | A | * | 7/1993 | Watanabe et al. | 358/296 |
| 5,289,214 | A | * | 2/1994 | Zur | 347/120 |
| 5,432,534 | A | * | 7/1995 | Maruyama et al. | 347/172 |
| 5,957,700 | A | * | 9/1999 | Ariyama | 434/417 |
| 5,999,201 | A | * | 12/1999 | Dalal et al. | 347/115 |
| 6,112,046 | A | * | 8/2000 | Suzuki et al. | 399/359 |
| 6,283,567 | B1 | * | 9/2001 | Hori et al. | 347/2 |
| 6,318,825 | B1 | * | 11/2001 | Carau, Sr. | 347/2 |
| 6,381,428 | B1 | * | 4/2002 | Yamamoto et al. | 399/116 |
| 6,652,086 | B1 | * | 11/2003 | Tomida et al. | 347/101 |
| 6,686,941 | B2 | * | 2/2004 | Kamir et al. | 347/115 |
| 2002/0196482 | A1 | * | 12/2002 | Hoberock et al. | 358/500 |
| 2004/0075820 | A1 | * | 4/2004 | Chu et al. | 353/122 |

* cited by examiner

*Primary Examiner*—Andrew H. Hirshfeld
*Assistant Examiner*—Leo T. Hinze
(74) *Attorney, Agent, or Firm*—Mark M. Friedman

(57) ABSTRACT

A public presentation system is presented comprising a display system that can be remotely changed, so that multiple different images are successively displayed with minimal interruption. The system utilizes ionography techniques for non-contact printing and imaging for display. Thus by exploiting electrostatic imaging techniques, an advertisement can be displayed promptly by transferring a toner image onto an imaging belt.

21 Claims, 10 Drawing Sheets

METHOD AND SYSTEM FOR DISPLAYING AN IMAGE ON A SCREEN

This is a Continuation of U.S. patent application Ser. No. 09/781,900, filed Feb. 13, 2001, now U.S. Pat. No. 6,686, 941

FIELD OF THE INVENTION

The present relates to display boards in general and to remotely changing the displayed information on the display boards in particular.

BACKGROUND OF THE INVENTION

One common form of display utilizes poster displays usually located at strategic road junctions for maximum effect. Such posters are commonly pasted on large display boards and remain for the time period paid for, after which the poster is replaced. A major disadvantage of the poster display is that it is restricted to displaying one poster at a time.

In order to maximize the available net display area, various systems have been developed which allow several, usually not more than three, separate advertisements to be displayed on the same display area. One system uses a rotating screen which contains two advertisements, one of which is visibly displayed at a time.

A second system utilizes a plurality of rotatable triangular slats which allows three separate advertisements to be shown. Each advertisement occupies the whole display area and is cut into strips to enable the slats to be rotated. The slats can be rotated at regular intervals so that each of the three advertisements is consequently displayed.

These existing systems are also limited in that in order to change the one or more of the advertisements, it is necessary to physically replace the poster in situ.

One of the methods for forming an image on a surface is electrophotography. Electrophotography forms a latent image on a photoconductor which is then developed using toner. The toner image is then transferred to a substrate.

Another technique for non-contact printing and imaging is ionography. An example of ionography, by the transfer of electrostatic images on to a dielectric surface using toner, is described in U.S. Pat. No. 5,289,214 to Zur.

Computer controlled display systems are usually based on some kind of projection of an image. The practical solutions, due to the limited power of the lamp are such that the image cannot be seen with a good contrast in outdoor applications, due to the high brightness of the ambient sunlight.

This invention works in reflection mode like the classical poster display, that is it uses the ambient light as light source.

SUMMARY OF THE INVENTION

An object of the present invention is to provide a display system that can be remotely changed, so that different images are successively displayed with minimal interruption.

A further object of the present invention is to utilize ionography techniques for non-contact printing and imaging for display. Thus by exploiting electrostatic imaging techniques, an advertisement can be displayed promptly by transferring a toner image onto an imaging belt.

A further object of the present invention is to provide a display board that can be used both during daylight and at night.

There is thus provided, in accordance with a preferred embodiment of the present invention, a display system which includes at least one display screen, printing means for transferring color images on to the at least one display screen, erasing means for erasing the color images from the at least one display screen and drive means connected to the at least one display screen for operatingly moving the at least one display screen.

Furthermore, in accordance with a preferred embodiment of the present invention, the drive means moves the at least one display screen from a first printing position to a second viewing position.

In addition, in accordance with a preferred embodiment of the present invention, the system according to claim 1 further includes an interface control unit coupled to at least the at least one display screen and processing means communicating with the interface control unit to control the display of the images.

Furthermore, in accordance with a preferred embodiment of the present invention, the display screen includes a plurality of display screens, each of which displays a separate color separation of the image.

In addition, in accordance with a preferred embodiment of the present invention, the system also includes a dual purpose screen having a substantially white reflective diffusing portion and a substantially transparent portion and a substantially transparent protective screen placed in front of the at least one display screen. Each of the plurality of display screens includes an endless dielectric imaging belt.

Furthermore, in accordance with a preferred embodiment of the present invention, each of the separate color separation images is a digitized version for one of each of the three color separations of cyan, magenta and yellow (C, M and Y).

In addition, in accordance with a preferred embodiment of the present invention, the printing means includes a separate toner reservoir for each of the separate color separation images and writing means for applying toner from each of the separate toner reservoirs onto each of the at least one display screen.

Furthermore, in accordance with a preferred embodiment of the present invention, the erasing means includes static eliminators for cleaning and erasing the toner from the at least one display screen and at least one receptacle for the at least one display screen for receiving and storing the removed toner. The static eliminators comprise one of a group of eliminators including active hot static eliminators; active shockless static eliminators and passive static eliminators.

Furthermore, in accordance with a preferred embodiment of the present invention, the system further includes pumping means to transfer toner from each of the at least one-receptacles to the corresponding toner reservoir.

In addition, in accordance with a preferred embodiment of the present invention, the drive means is connected to the dual purpose screen for operatingly moving the dual purpose screen from a first position wherein the substantially white reflective diffusing portion is placed behind the at least one display screen to a second position wherein the substantially transparent portion is placed behind the at least one display screen.

Additionally, there is provided a display system which includes a single display screen and a plurality of printing arrangements located adjacent it, each printing arrangement for each of base colors.

Furthermore, in accordance with a preferred embodiment of the present invention, the interface control unit is coupled to the drive means.

The system further includes a roller track for supporting the writing means thereby to allow the writing means to be moved longitudinally along the track. The roller track further supports the erasing means thereby to allow the erasing means to be moved longitudinally along the track.

Furthermore, in accordance with a preferred embodiment of the present invention, the movement of the printing means and erasing means is controlled by the interface and control unit.

Additionally, there is provided, in accordance with a preferred embodiment of the present invention, a method for producing at least one display image onto a screen. The method includes the steps of:

preparing the at least one display image;

communicating the at least one display image to an interface and control unit;

printing the prepared at least one display image on to at least one display screen; and moving the at least one display screen into position for viewing.

Furthermore, in accordance with a preferred embodiment of the present invention, the method further includes the step of erasing the displayed image and also includes the steps of:

preparing a replacement display image; and communicating the replacement display image to the interface and control unit.

In addition, in accordance with a preferred embodiment of the present invention, the method further includes the step of concurrently printing the replacement display image while the first displayed image is being erased, the step of printing the replacement display image on a separate part of the at least one display screen while the first image is being displayed and the step of erasing an image and concurrently printing a replacement display image on a separate part of the at least one display screen while another image is being displayed.

Alternatively, the method may comprise the step of depositing base colors images to a single display screen concurrently.

Furthermore, in accordance with a preferred embodiment of the present invention, the method further includes the step of moving a dual purpose screen having a substantially white reflective diffusing portion and a substantially transparent portion behind the at least one display screen. Moving includes the step of activating the dual purpose screen to move the substantially transparent portion behind the at least one display screen whenever the amount of light falls below a pre-determined level.

In addition, in accordance with a preferred embodiment of the present invention, the printing step includes the steps of:

storing toner for each of the separate color separation images in separate reservoirs; and applying toner from each of the separate toner reservoirs onto each of the corresponding plurality of display screens.

Finally, the step of erasing the displayed image includes the steps of removing the toner frond each of the plurality of display screens and storing the removed toner for reuse in the separate toner reservoirs.

BRIEF DESCRIPTION OF THE DRAWINGS

The present invention will be understood and appreciated more fully from the following detailed description taken in conjunction with the appended drawings in which.

DETAILED DESCRIPTION OF THE PRESENT INVENTION

Figure 1:
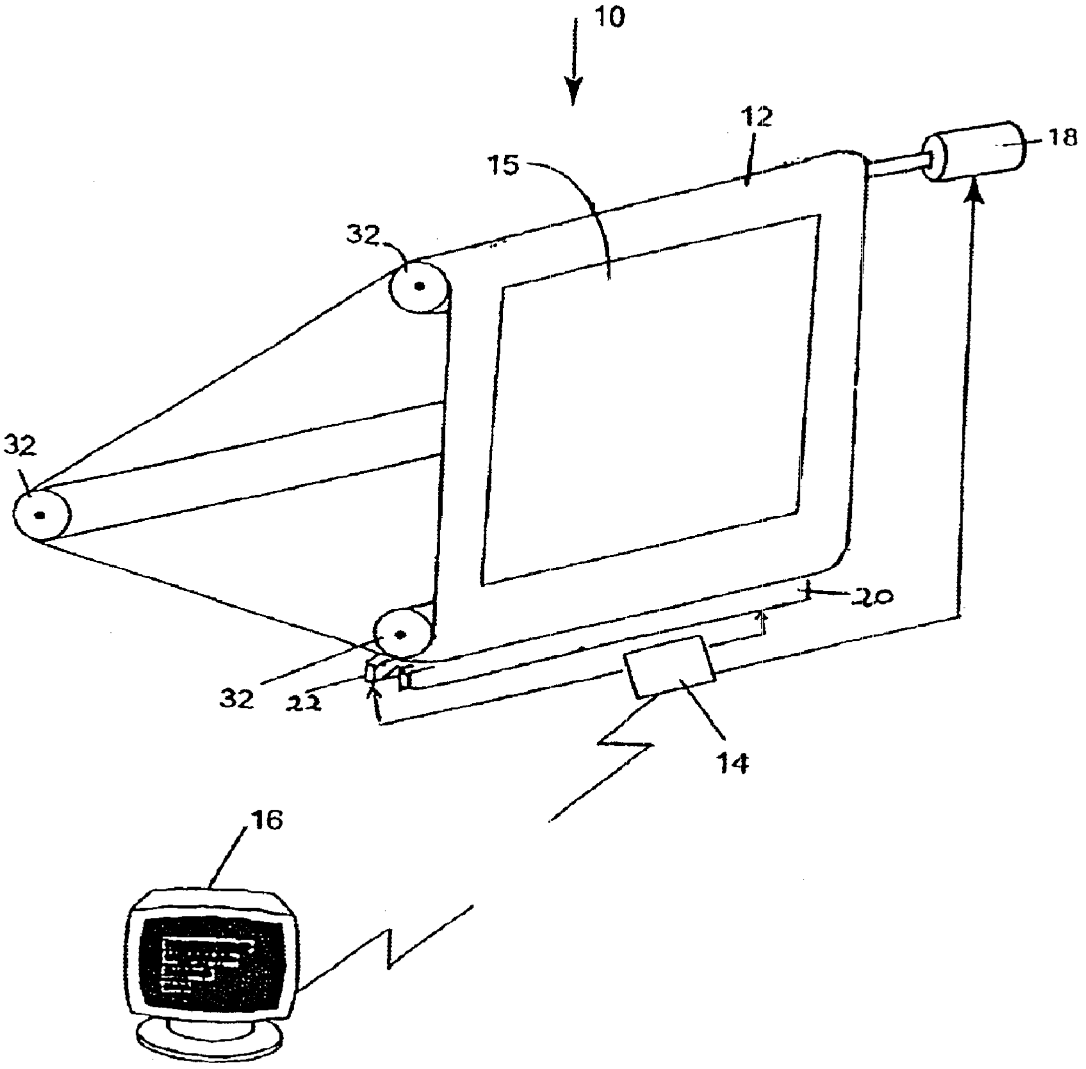
FIG. 1 is a schematic illustration of a display system, according to a preferred embodiment of the present invention.
Figure 2:
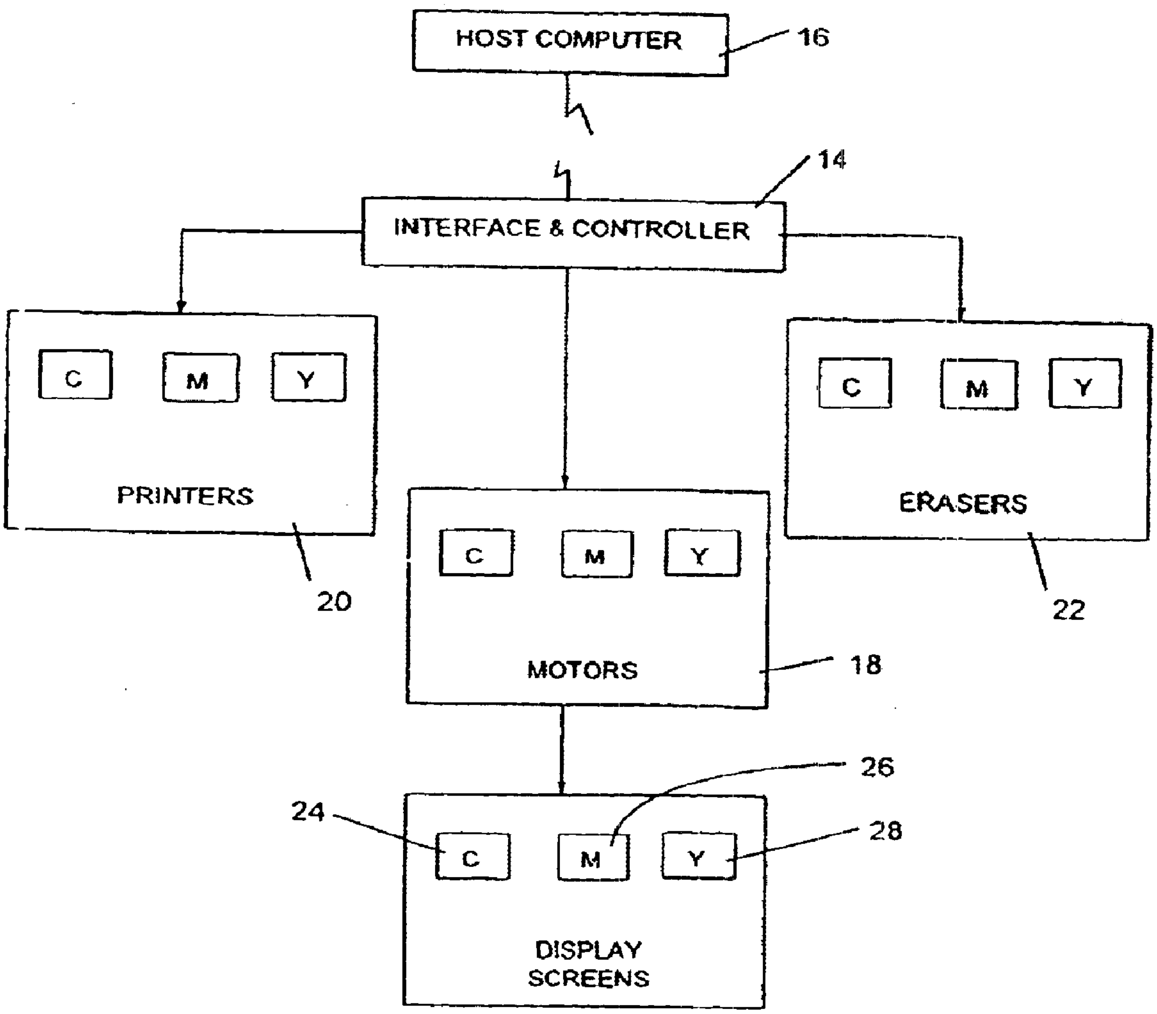
FIG. 2 is a high level block diagram illustration of the components of the display system of FIG. 1.
Figure 2A:
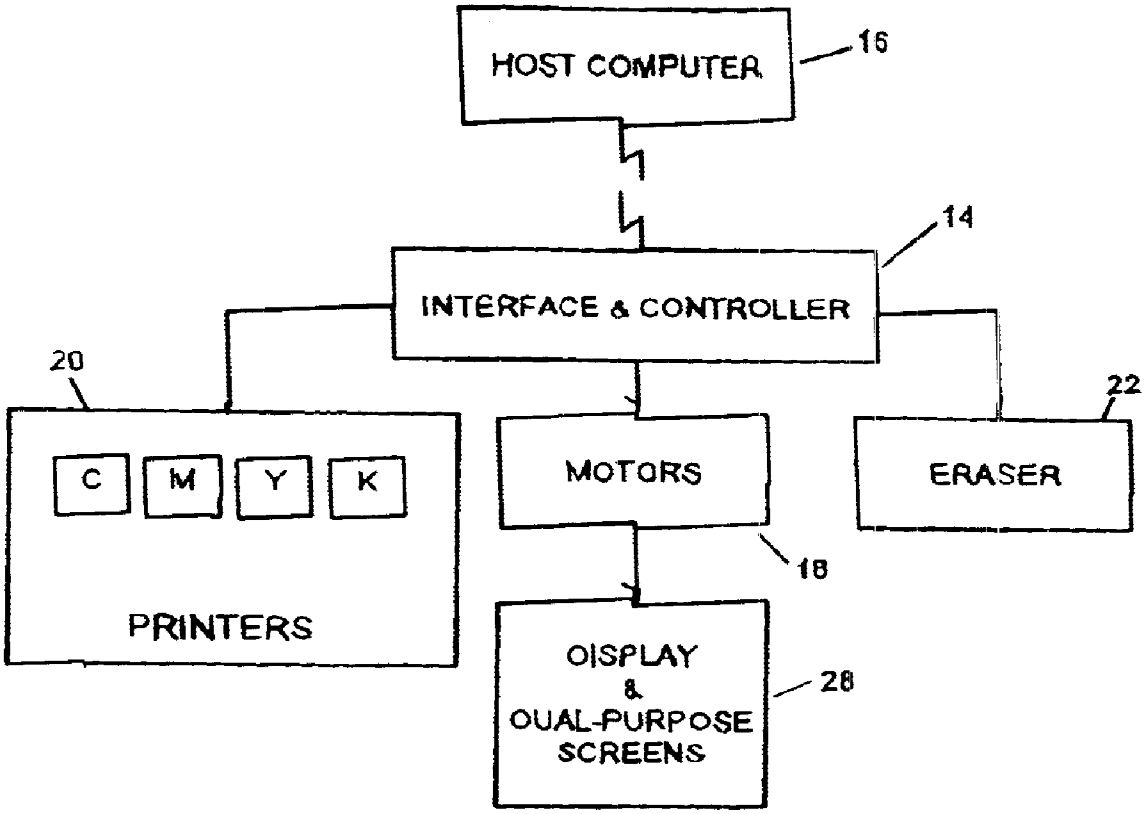
FIG. 2A is a high level block diagram illustration of the components of the display system of FIG. 1 when a single display screen is used.
Figure 3:
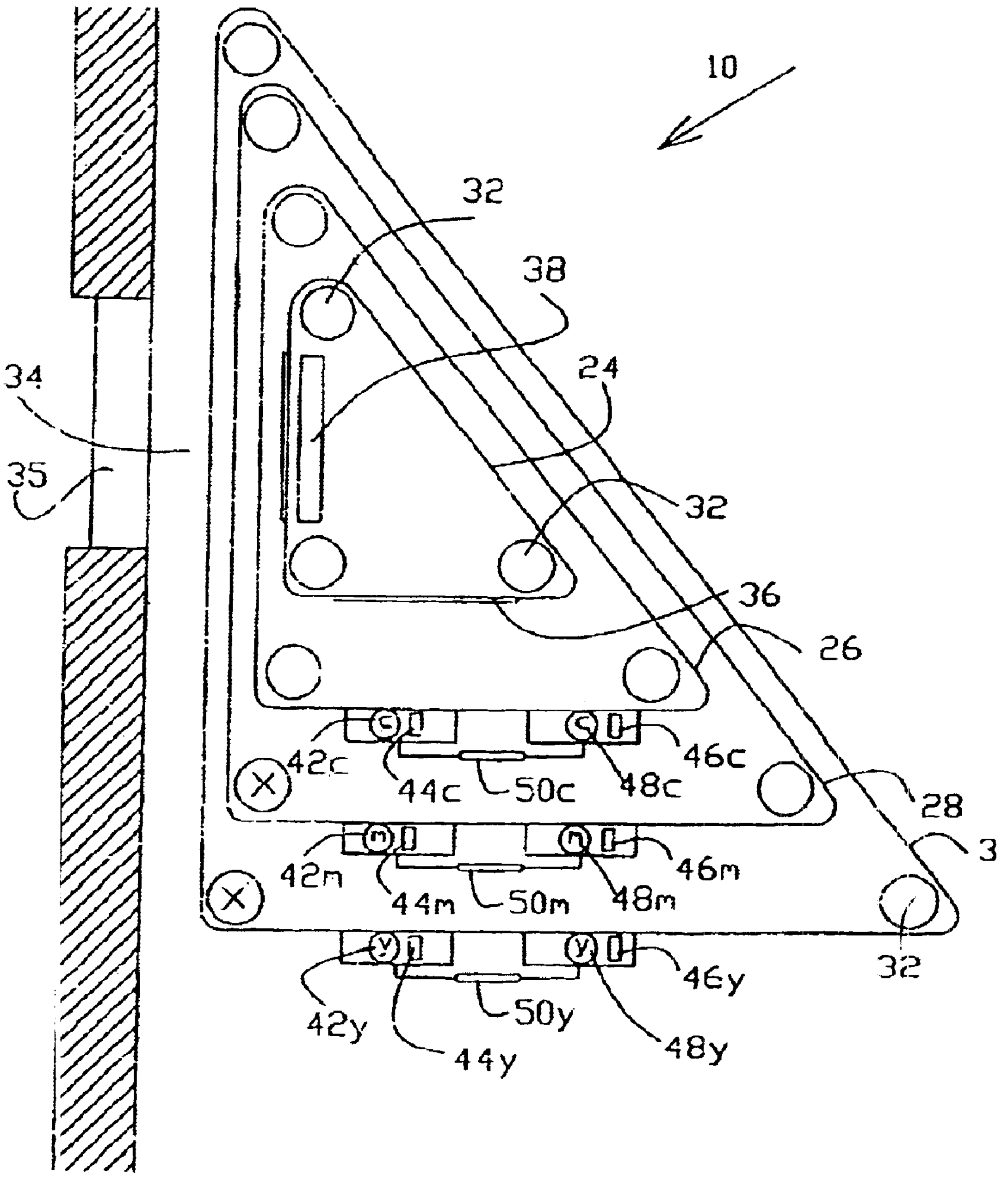
FIG. 3 is a side elevational view of the display screen of FIG. 1.
Figure 3A:
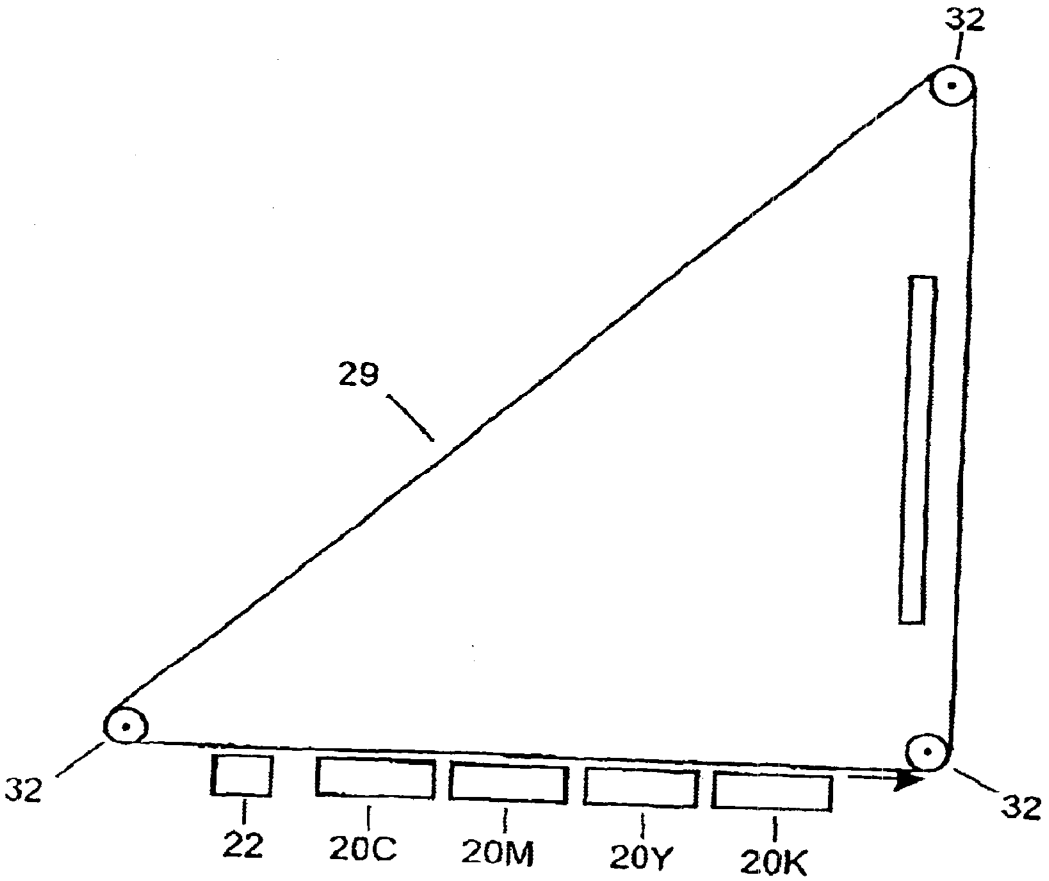
FIG. 3A is a side elevational view of the display screen of FIG. 1 when a single display screen is used.

Reference is now made to FIGS. 1–3A. FIG. 1 is a schematic illustration of a display system, generally designated 10, according to a preferred embodiment of the present invention. FIGS. 2 and 2A are high level block diagram illustrations of the components of the display system 10. FIGS. 3 and 3A are side view of the display screen 12, used in the system.

The display system 10 comprises a display screen, generally designated 12 connected, via an interface and control unit 14, to a computer system 16. Computer system 16, which is preferably situated at a separate central location, remotely communicates with interface and control unit 14 to direct the operation and control the display of an image 15 on the display screen 12. The display system 10 further comprises drive means 18, operable by computer system 16 via interface and control unit 14, printing means, generally designated 20, for depositing color images on to the display screen 12, and erasing means, generally designated 22, for erasing or removing the deposited toner. Printing means 20 and erasing means 22 are connected to interface and control unit 14.

Display screen 12 comprises a plurality of display screens 26, 28 and 30, which are superimposed on each other, each of which is utilized to display a different color. The plurality of display screens 26, 28 and 30 are situated one behind the other so that the display screen 12 displays a composite image comprising the three images deposited on each of the display screens 26, 28 and 30.

A plurality of printing means 20, one for each of display screens 26, 28 and 30 is placed proximate to the screens, to deposit color images on the display screens to create the complete advertisement. The erasing means 22 are used to remove or erase the deposited toner. Printing means 20 and erasing means 22 are located adjacent to each of the three display screens 26, 28 and 30.

Display screen 12 comprises a dual purpose screen 24 and three display screens, referenced 26, 28 and 30 which are located close to one another and in front of the dual purpose screen 24. Each of the three display screens 26, 28 and 30 are similar.

Alternatively, as shown in FIG. 3A, the display screen comprise a single display screen 29 on which a color image is created by employing a plurality of printing means 20C, 20M, 20Y and 20K, one for each color, situated located adjacent display screen 29.

Preferably, a transparent screen 35 is also placed in front of the display screens 26, 28 and 30 or in front of screen 29 in order to protect the screens from the elements.

Dual purpose screen 24 comprises a continuous loop of material stretched over a plurality of rollers 32. In the example of the embodiment of FIGS. 3 and 4, dual purpose screen 24 comprises two different types of screen, a white screen 34 which is substantially opaque for use during daylight and a transparent screen 36 for use during the hours of darkness. The dual purpose screen 24 may be rotated in either clockwise or anti-clockwise direction to select the required screen, as appropriate, that is, white screen 34 for daylight use or transparent screen 36 for night use.

A backlighting system, generally designated 38 for use with the transparent screen 36 during night use is connected to interface and control unit 14.

Figure 4:
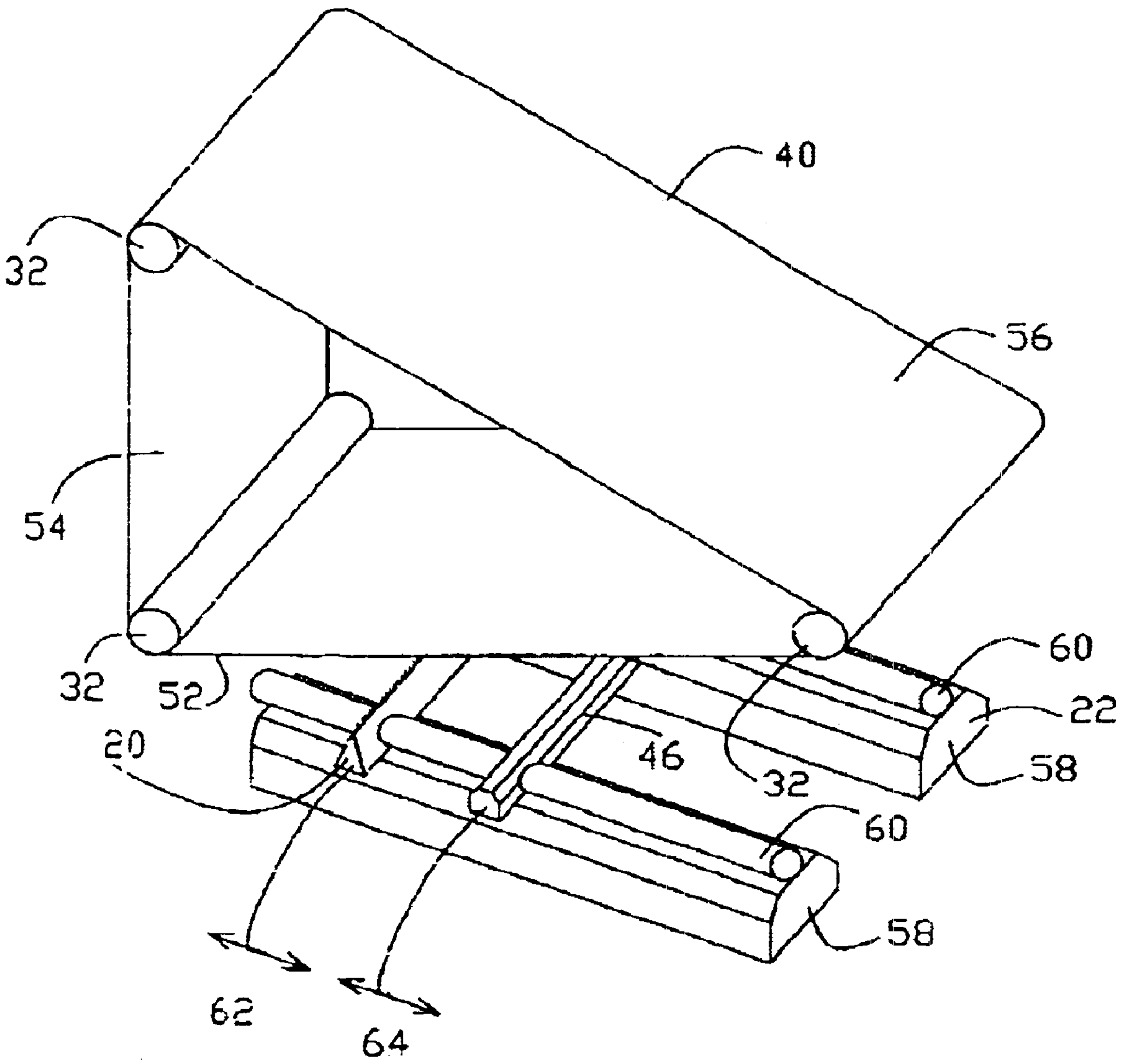
FIG. 4 is a detailed schematic isometric view of one of the display screens of FIG. 1.

Reference is now also made to FIG. 4 which is a detailed schematic isometric view of one of the display screens (26, 28 or 30). Each of the three display screens 26, 28 and 30 comprises an endless loop (or belt), generally designated 40, of image separation sheet material on to which a specific color toner image is transferred. Preferably, the loop of material for each of three display screens 26, 28 and 30 is composed of a dielectric imaging belt 40, composed of polyester, for example. For the purposes of example only, loop 40 is shown as having a triangular configuration consisting of a base 52, a front display side 54 and a hypotenuse 56.

In the embodiment of a single display screen 29 a single endless loop (or belt), is used.

Printing means 20 and erasing means 22 are suitably supported, for example by a pair of stands 58, each having a roller track 60 affixed thereto. Both printing means 20 and erasing means 22 are movable longitudinally along the tracks 60, as illustrated by arrows 62 and 64, respectively. The movement of printing means 20 and erasing means 22 is controlled by interface and control unit 14.

In another embodiment of a single display screen, plurality of printing means 20C, 20M, 20Y and 20K, and erasing means 22 are suitably supported, for example by a pair of stands 58, each having a roller track 60 affixed thereto. Both printing means 20 and erasing means 22 are movable longitudinally along the tracks 60, as illustrated by arrows 62 and 64, respectively. The movement of printing means 20 and erasing means 22 is controlled by interface and control unit 14. Alternatively, printing means 20 and erasing means 22 may be stationary, while the needed relative movement between these means and the display screen may be achieved by way of movement of the display screen.

The display system 10 produces color images by depositing three separate images onto each of the three display screens 26, 28 and 30. Each separate image is a digitized version (or separation file), one for each of the three color separations of cyan, magenta and yellow (C, M and Y).

According to another embodiment of the invention of a single screen, display system 10 produces color images by combining images deposited for each base color, using a plurality of printing means 20, one for each of base color. Erasing of the images is carried out by using erasing means 22.

Drive means 18 may comprise any suitable apparatus for moving the display screens 26, 28 and 30 and the dual purpose screen 24, such as electrically or hydraulically operated motors, for example.

Figure 5:
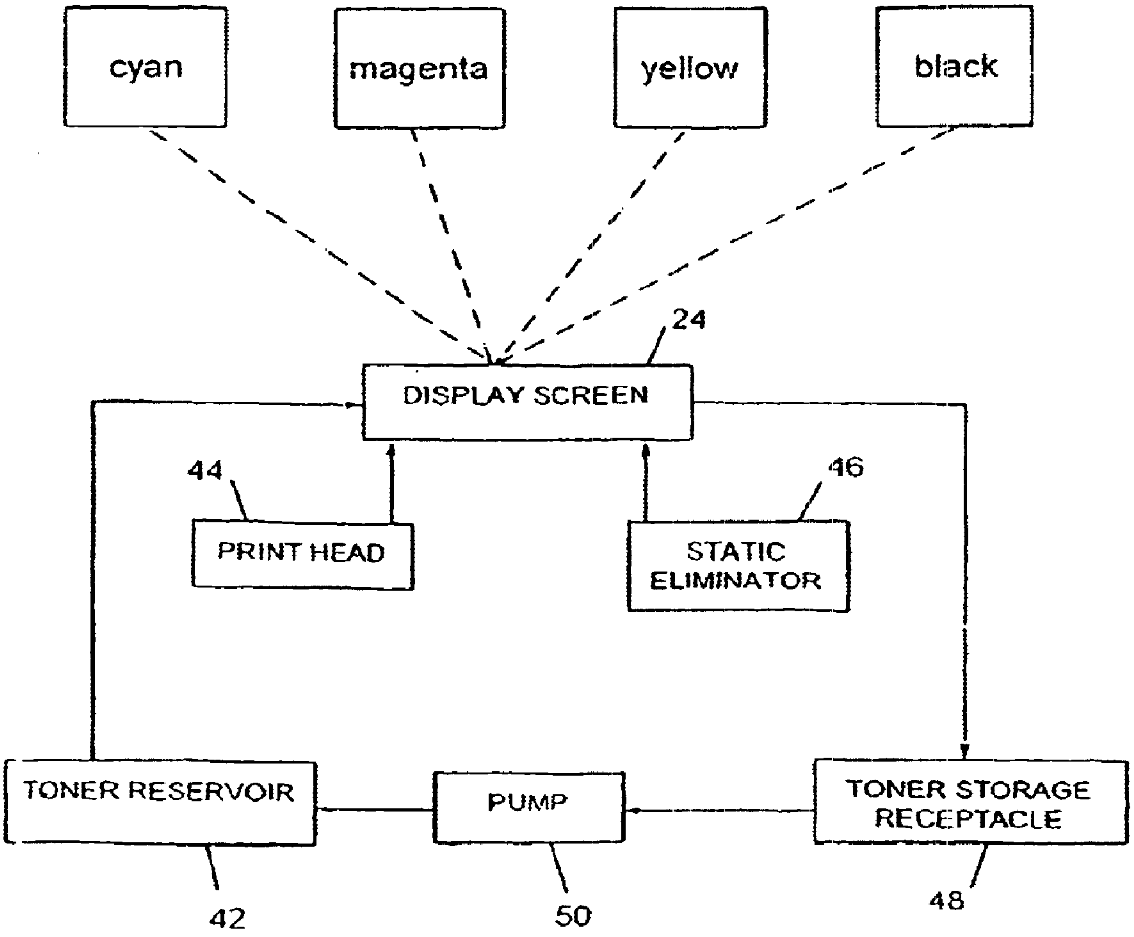
FIG. 5 is a high level block diagram illustration of the operation of preparing an advertisement for display.

Reference is now made to FIG. 5, which is a block diagram illustration of the operation of preparing an advertisement for display.

Printing means 20, which is located adjacent to each belt 40 of the three display screens 26, 28 and 30, is similar for each of the three display screens 26, 28 and 30. Printing means 20 comprises a toner reservoir, generally referenced 42, and writing means, generally designated 44, for each of the four color separations of cyan, magenta yellow and black.

For reference, the various components (reservoirs, writing means) for each of the three color separations of cyan, magenta yellow and black are identified by a suffix (C, M Y or K) indicating their color (Cyan, Magenta or Yellow). Thus reservoir 42M and writing means 44M refer to screen 28 which receives the magenta color. Alternatively a single screen may be used.

The image is transferred by means of an ionographic writing head, such as manufactured by Delphax Systems of Canton, Mass., United States. Briefly, the print system consists of a multi-stage process for transferring the image onto imaging belt 40 and optionally erasing the imaged message.

Firstly, using ion-deposition, a latent charge image is formed on imaging belt 40. Then the image is developed by applying toner of the respective color (C, M Y or K), contained in the corresponding reservoir 42C, 42M 42Y or 42K. Preferably, the toner has transmission characteristics similar to those in standard xerographic reproduction equipment.

Each of the image separation sheets (of display screens 26, 28 and 30) are similarly prepared, that is toner of the respective color is applied to each sheet.

The sheets are then moved into position, one behind the other, behind transparent screen 35 so that the combination of display screens 26, 28 and 30 form the complete image for viewing.

According to another embodiment of the invention only single display screen 29 is employed along each four printing means 20M, 20C 20Y and K, that are situated adjacently. Using ion-deposition, a latent charge image is formed on imaging belt 40. Then the image is developed by applying toner of the respective color (C, M, Y or K), contained in the corresponding reservoir 42C, 42M, 42Y or K. Preferably, the toner has transmission characteristics similar to those in standard xerographic reproduction equipment.

During daylight hours, the white screen 34 portion of dual purpose screen 24 is moved into position. Whenever the amount of light falls below a pre-determined level, such as during the night, the dual purpose screen 24 is activated to move so that the transparent screen 36 portion of the dual purpose screen 24 is placed behind the display screens 26, 28 and 30, and the back lighting system 38 is operated.

To remove or erase the image from each of the image separation sheets (of display screens 26, 28 and 30), the relevant imaging belt 40 is rotated clockwise so as to come into contact with erasing means 22. Erasing means 22 comprise static eliminators, generally designated 46, for cleaning and erasing the toner of a previous image from the display screens 26, 28 and 30 and at least one receptacle, generally referenced 48, for receiving and storing the respective toner being removed. A new image can now be applied by writing units 44, and then moved into position for displaying. In another embodiment of the invention to remove or erase the image from the image screen, the imaging belt 40 is rotated clockwise so as to come into contact with erasing means 22.

A pump 50, or other transfer means, connects each storage receptacle 48 to the corresponding reservoir 42. Removed toner can then be reused for the next display.

The static eliminators 46, are commercially available active or passive eliminators, such as those manufactured by Chapman Inc. of Portland, Me., USA.

Basically, active static eliminators which may be "hot" or shockless, combine emitter points to create ions and a high voltage power supply to control the electrical energy delivered to the emitters. Sufficiently high energy is used to induce Ionization without causing arcing. Hot bars which produce more ionization, are used where they can be mounted out of the way of human contact. The emitter points of shockless static eliminators receive their high voltage indirectly via a resistor or capacitor so that the a low level current is passed.

Passive static eliminators basically work by induction similar to a lightning rod and generally comprise tinsel or brushes.

Figure 6:
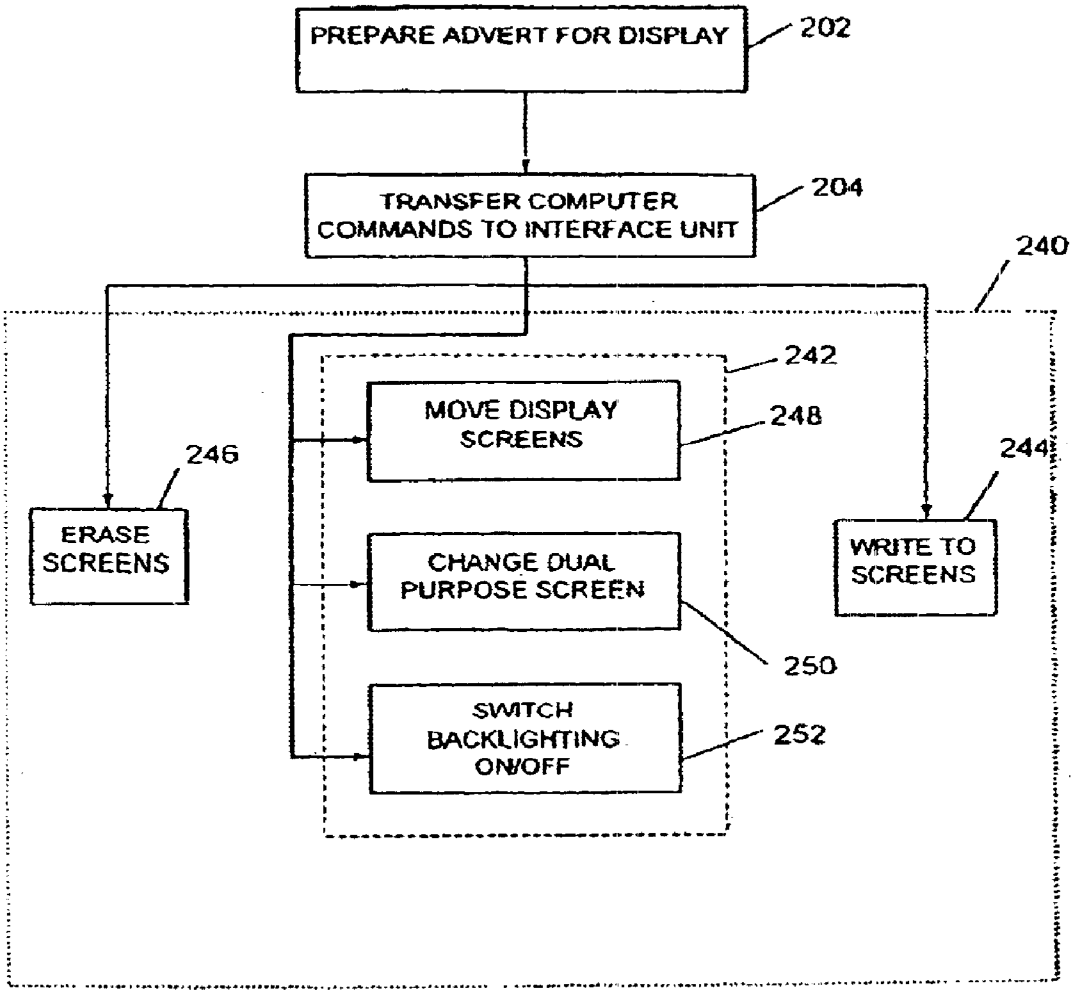
FIG. 6 is a high level block diagram illustration of the operational steps for producing a display advertisement.

Reference is now made to FIG. 6 which is high level block diagram illustration of the operational steps for producing a display, such as an advertisement.

The advertisement to be displayed is first prepared on the computer system 16, using a graphic arts program or similar (step 202). The computer system 16, transfers details of the advertisement and other display commands by radio or other remote transfer means to the interface and control unit 14 (step 204).

The interface and control unit 14, which is connected to the display screen 12, relays the commands received from the computer system 16 to the various operational devices (step 240).

Basically, there are three kinds of operational commands (step 240) which may be transmitted, as follows:

a) for the operation of the drive means 18 (step 242);

b) instructions for writing, that is depositing toner on any or all of the screens (step 244); and c) instructions for removing toner (step 246).

The operation of the drive means 18 (step 242) may move any or all of the display screens 26, 28 and 30 (step 248), change the dual purpose screen 24 (step 250) and switch the backlighting system 38 (step 252) on/off.

There are several alternative combinations of step sequences which may be performed for writing, displaying or erasing the advertisement. For example, toner can be deposited according to the image (step 244), and as described in the embodiment of FIG. 3, simultaneously moved into position (step 248). Also, each screen can be prepared either concurrently or consecutively. Alternatively, as described hereinbelow, the image can be first deposited and later, when the image has been completed, moved into viewing position.

The steps of changing the dual purpose screen 24 (step 252) and switching the backlighting system 38 (step 254) on/off are carried out as necessary depending on the prevailing lighting conditions.

Figure 7A:
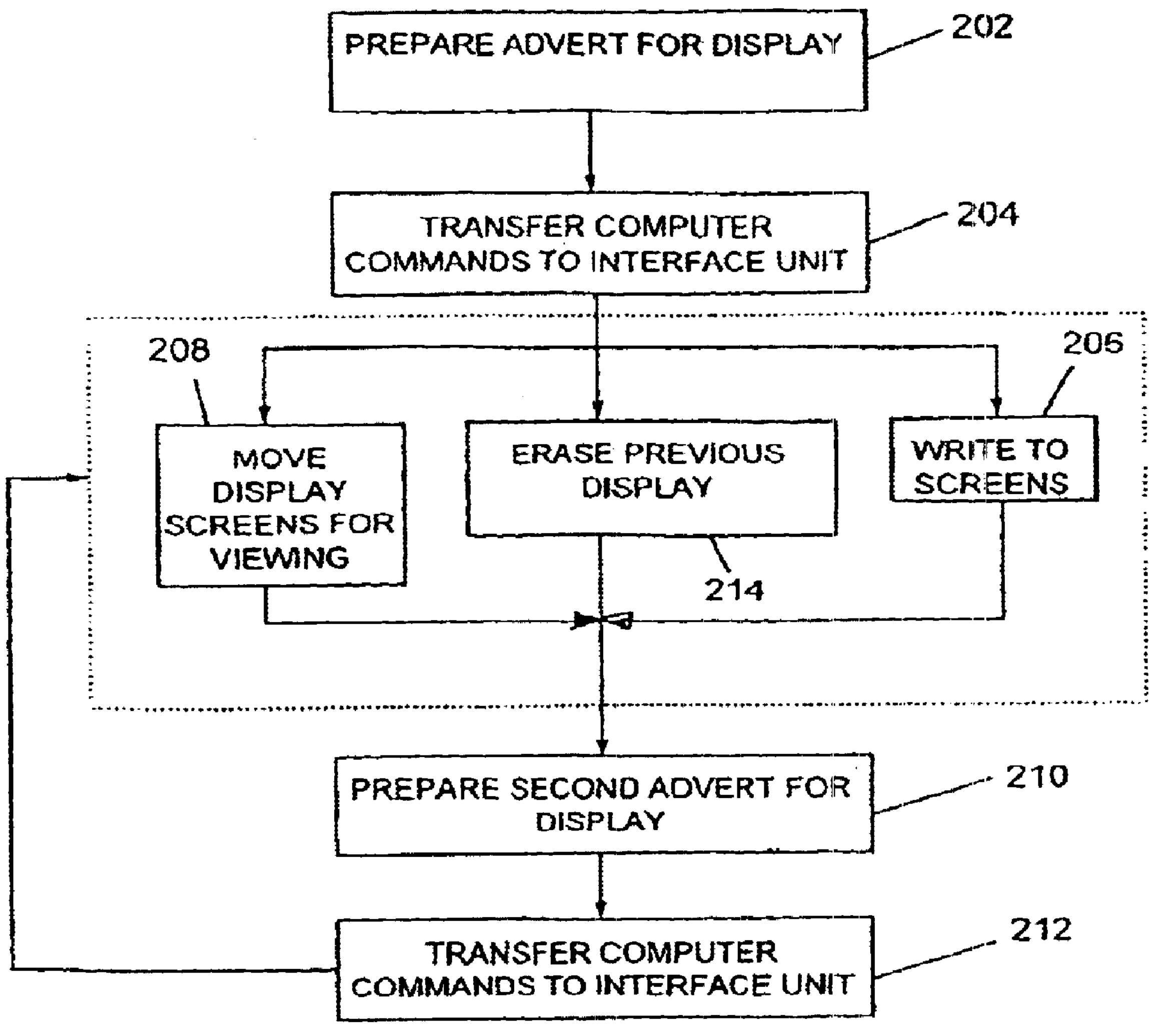
FIG. 7A is a flow chart illustration of the operational steps of a preferred embodiment for producing an interchangeable display.
Figure 7B:
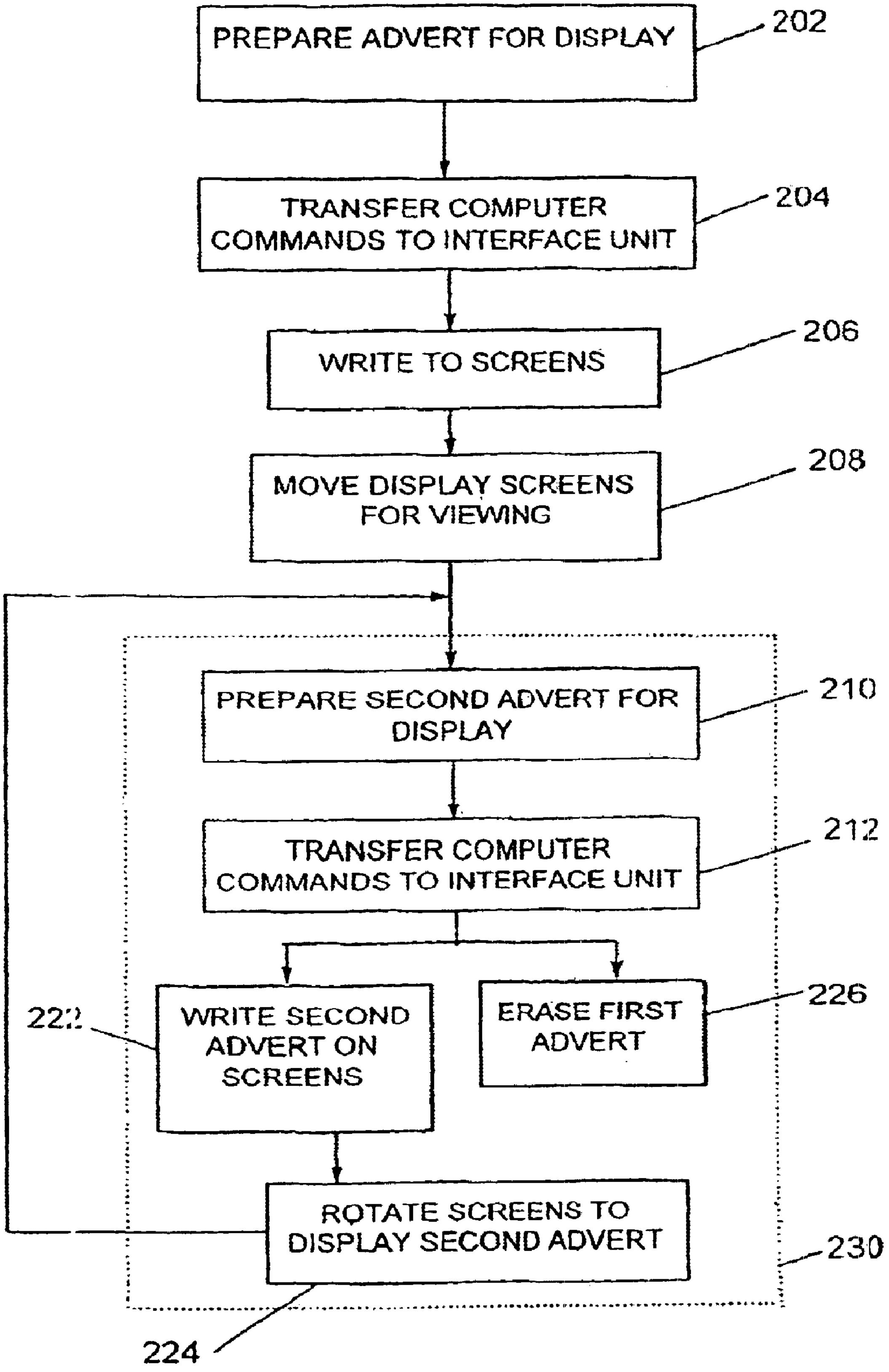
FIG. 7B is a flow chart illustration of the operational steps of a further preferred embodiment for producing an interchangeable display.

Reference is now made to FIGS. 7A and 7B, which are flow chart illustrations of the operational steps of embodiments for producing interchangeable display. Operational steps which are similar to operational steps which have been previously described with respect to the preferred embodiment hereinabove, are similarly designated and will not be further described.

Referring to a first embodiment to produce an interchangeable advertisement display (FIG. 7A), each of the three display screens 26, 28 and 30, is configured for at least two advertisements, using the same writing means 44 for writing both images to be displayed.

In this embodiment, the first advertisement is prepared on the computer system 16, using a graphic arts program or similar (step 202). The computer system 16, transfers commands by radio or other remote transfer means to the interface and control unit 14 (step 204).

The interface and control unit 14, which is connected to the display screen 12, relays the commands received from the host computer 16 for depositing toner on the three display screens 26, 28 and 30 (step 210) from the writing means 44 and simultaneously the three screens are moved into position (step 208).

To display a replacement advertisement, the replacement advertisement is prepared and transferred to the interface and control unit 14 (steps 210 and 212), similar to steps 202 and 204 described for the first advertisement. The first advertisement is erased (step 214) and the second different advertisement is written onto the screen (step 206) and displayed on display screens 26, 28 and 30 (step 208). Erasure of the first advertisement takes place at the same time as the screen is being moved, and the next advertisement is being written onto the screen. Further advertisements can be prepared and displayed by repeating the steps 206–214 (dashed box 220).

As will be appreciated, while the first advert is being written to a clean screen, erasure does not take place.

In an alternative embodiment, illustrated in FIG. 7B, after the first advertisement has been prepared (step 202) and is being displayed (step 204), a second advertisement is prepared and transferred to the interface and control unit 14 (steps 210 and 212), The second advertisement can be written to an available blank part of the display screens 26, 28 and 30, which is out of view of the dual purpose screen 24, at the same time as the first advertisement is being displayed (step 222).

In this embodiment printing means 20 are moved longitudinally along the tracks 60 (FIG. 3), so as to cover the whole surface of the screen, without moving the screen (step 222). Similarly, erasing means 22 can also be moved longitudinally along the tracks 60 to erase the image (step 226) without the necessity for moving the screen.

In yet another embodiment the printing means and the erasing means may be stationary, while the printing and erasing operations are performed when the display screen is moved to its next position.

To display the second advertisement, display screens 26, 28 and 30 are rotated so that the second advertisement is brought in front of the dual purpose screen 24 and the first advertisement is hidden from view (step 224). Steps 210–226 (dashed box 230) can be repeated for other replacement advertisements.

It will be appreciated by persons knowledgeable in the art that the present invention is not limited to the printing methods described hereinabove but is also applicable to other methods such as ink-jet printing. Furthermore, the present invention is not limited to being controlled by a remote host but that a stand alone system in which a plurality of alternating print advertisements are stored in a buffer may also be used.

It will be appreciated by persons skilled in the art that the present invention is not limited by what has been particularly shown and described herein above. Rather the scope of the invention is defined by the claims which follow:

What is claimed is:

1. A display system comprising: a display screen including one endless imaging belt; a printing means including at least three toner reservoirs and three writing means, each of said toner reservoirs being configured for containing a different color toner, each of said toner reservoirs being associated with one of said writing means, said writing means being configured for a fusionless transfer of said different color toner from said toner reservoirs onto said one endless imaging belt, such that said printing means forms a non-fused multicolored image on said one endless imaging belt;

an erasing means for erasing said multicolored image from said one endless imaging belt;

a drive means operationally connected to said one endless imaging belt for moving said one endless imaging belt from a printing position to a viewing position; and a dual purpose screen having a substantially white reflective diffusing portion and a substantially transparent portion.

2. The system according to claim 1 and further comprising:

an interface control unit coupled to at least said display screen; and processing means communicating with said interface control unit to control the display of said image.

3. The system according to claim 2 wherein said interface control unit is coupled to said drive means.

4. The system according to claim 1 wherein said drive means is connected to said dual purpose screen for operatively moving said dual purpose screen from a first position wherein said substantially white reflective diffusing portion is placed behind said display screen to a second position wherein said substantially transparent portion is placed behind said display screen.

5. The system according to claim 1 and further comprising a substantially transparent protective screen placed in front of said display screen.

6. The system according to claim 1 wherein said one endless imaging belt is an endless dielectric imaging belt.

7. The system according to claim 1 wherein said erasing means comprises:

static eliminators for removing said different color toner from said one endless imaging belt; and a receptacle for receiving and storing the removed toner.

8. The system according to claim 7 wherein said static eliminators comprise one of a group of eliminators including active hot static eliminators; active shockless static eliminators and passive static eliminators.

9. A method for producing at least one display image onto a screen, said method comprising the steps of:

preparing said at least one display image;

communicating said at least one display image to an interface and control unit;

printing said prepared at least one display image on to at least one display screen;

moving said at least one display screen into position for viewing; and moving a dual purpose screen having a substantially white reflective diffusing portion and a substantially transparent portion behind said at least one display screen.

10. A method according to claim 9 and further comprising the step of erasing said displayed image.

11. A method according to claim 9 and further comprising the steps of:

preparing a replacement display image; and communicating said replacement display image to said interface and control unit.

12. A method according to claim 11 and further comprising the step of concurrently printing said replacement display image while a previous, displayed image is being erased.

13. A method according to claim 11 and further comprising the step of printing said replacement display image on a separate part of said at least one display screen while said first image is being displayed.

14. A method according to claim 11 and further comprising the step of erasing a first image and concurrently printing a replacement display image on a separate part of said at least one display screen while another image is being displayed.

15. A method according to claim 11 and further comprising the step of replacing said first image with said replacement display image.

16. A method according to claim 9 if wherein said step of moving a dual purpose screen comprises the step of activating said dual purpose screen to move said substantially transparent portion behind said at least one display screen whenever the amount of light falls below a predetermined level.

17. A method according to claim 9 wherein each of said at least one display screen comprises a plurality of display screens each of which displays a separate color separation of said image.

18. A method according to claim 17 wherein said printing step comprises the steps of:

storing toner for each of said separate color separation images in separate reservoirs; and applying toner from each of said separate toner reservoirs onto each of said corresponding plurality of display screens.

19. A method according to claim 18 wherein said step of erasing said displayed image comprises the steps of:

removing said toner from each of said plurality of display screens; and storing said removed toner for reuse in said separate toner reservoirs.

20. A display system comprising:

a display screen including at least three nested endless imaging belts;

a printing means including at least three toner reservoirs and at least three writing means, each of said toner reservoirs being configured for containing a different color toner, each of said toner reservoirs being associated with a different one of said writing means, each of said writing means being associated with a different one of said belts, each of said writing means being configured for transferring toner from an associated one of said toner reservoirs onto a different one of said belts thereby forming a mono-colored image on each of said belts, said mono-colored image of each of said belts being superimposed so as to form a multicolored image on said display screen;

at least three erasing means for erasing said mono-colored image from each of said belts, said belts being spaced apart so that said mono-colored image is erased from each of said belts by erasing only one side of each of said belts; and a drive means operationally connected to said belts for moving said belts from a printing position to a viewing position.

21. A method for displaying a color image, comprising the steps of:

providing a printing means supported by a roller track;

transferring the color image on to at least one display screen, by the printing means;

moving said printing means longitudinally along said roller track;

moving said display screen from a printing position to a viewing position; and erasing the color image from said display screen.

* * * * *